US011811599B1

(12) United States Patent
Du et al.

(10) Patent No.: US 11,811,599 B1
(45) Date of Patent: Nov. 7, 2023

(54) MULTI-VERSION COMPATIBILITY FOR CONNECTIVITY PROTOCOLS

(71) Applicant: INTERNATIONAL BUSINESS MACHINES CORPORATION, Armonk, NY (US)

(72) Inventors: Jiu Chang Du, Beijing (CN); Kui Zhang, Tianjin (CN); Zhan Peng Huo, Beijing (CN); Yong Qing Xu, Beijing (CN); Peng Hui Jiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/157,891

(22) Filed: Jan. 23, 2023

(51) Int. Cl.
*H04L 29/06* (2006.01)
*H04L 29/12* (2006.01)
(Continued)

(52) U.S. Cl.
CPC ...... *H04L 41/0813* (2013.01); *H04L 41/0866* (2013.01); *H04L 67/141* (2013.01)

(58) Field of Classification Search
CPC H04L 41/0813; H04L 41/0866; H04L 67/141
(Continued)

(56) References Cited

U.S. PATENT DOCUMENTS 6,532,241 B1 * 3/2003 Ferguson ............... H04L 69/18
709/200
9,215,232 B2 12/2015 Fu et al.
(Continued)

FOREIGN PATENT DOCUMENTS

CN 106656998 A * 5/2017
CN 109067698 A * 12/2018
(Continued)

OTHER PUBLICATIONS

Justin Ellingwood, "Understanding the SSH Encryption and Connection Process," Mar. 2022, DigitalOcean, https://www.digitalocean.com/community/tutorials/understanding-the-ssh-encryption-and-connection-process (Year: 2022).*

*Primary Examiner* — Ruolei Zong
(74) *Attorney, Agent, or Firm* — Stephanie Carusillo, Esq.; Blanche E. Schiller, Esq.; Heslin Rothenberg Farley & Mesiti P.C.

(57) ABSTRACT

A connection request from one computing entity is obtained. The connection request is a request to connect to another computing entity and includes a requested connectivity protocol configuration. A determination is made as to whether the requested connectivity protocol configuration is a match to a particular connectivity protocol configuration of the other computing entity. Based on determining that the requested connectivity protocol configuration is not a match to the particular connectivity protocol configuration of the other computing entity, a selected configuration file that is a match to the requested connectivity protocol configuration is selected from a plurality of configuration files. Based on selecting the selected configuration file, routing of the connection request to a connectivity protocol service corresponding to the selected configuration file is initiated to facilitate establishing a connection between the one computing entity and the other computing entity.

20 Claims, 12 Drawing Sheets

(51) Int. Cl.
    *H04L 41/0813* (2022.01)
    *H04L 67/141* (2022.01)
    *H04L 41/0866* (2022.01)

(58) Field of Classification Search
    USPC ......................................................... 709/221
    See application file for complete search history.

(56) References Cited

U.S. PATENT DOCUMENTS

| | | |
|---|---|---|
| 9,692,757 B1 | 6/2017 | Mikulski et al. |
| 10,003,458 B2 | 6/2018 | Ylonen |
| 11,029,940 B2 | 6/2021 | Peschansky et al. |
| 2004/0131170 A1* | 7/2004 | Wu ....................... H04M 3/493 |
| | | 379/220.01 |
| 2008/0250146 A1 | 10/2008 | Arwe et al. |
| 2009/0064126 A1 | 3/2009 | Elord et al. |
| 2015/0288675 A1* | 10/2015 | Burke ................ H04L 41/28 |
| | | 726/6 |
| 2016/0012465 A1* | 1/2016 | Sharp .................. G06Q 20/321 |
| | | 705/14.17 |
| 2019/0075134 A1* | 3/2019 | Ylonen ............... H04L 63/0442 |

FOREIGN PATENT DOCUMENTS

| | | |
|---|---|---|
| CN | 112019477 A | 12/2020 |
| WO | WO2016070538 A1 | 5/2016 |

* cited by examiner

MULTI-VERSION COMPATIBILITY FOR CONNECTIVITY PROTOCOLS

BACKGROUND

One or more aspects relate, in general, to facilitating processing within a computing environment, and in particular, to improving connectivity within the computing environment.

To connect computing entities, such as clients and servers, within a computing environment, connectivity protocols are used. Such protocols are used by tools to provide, for instance, secure channels between the computing entities, secure remote access to resources, remote execution of commands, management of selected hardware and/or software components and/or the provision of updates to certain tasks. These protocols may be used to encrypt traffic between the computing entities to eliminate eavesdropping and unwanted events, such as improperly taking control of connections.

The computing entities may run on separate computing devices, and in some environments that are quite complex, there may be numerous types of computing devices that are interconnected. Such environments may include personal computers, workstations, minicomputers and/or mainframes and those different types of machines may run different types of operating systems and/or other programs. In such environments, the different devices may upgrade their connectivity protocols at different times, which may lead to compatibility issues.

If the connectivity protocols are incompatible (e.g., due to being at different versions or levels), one or more connections may fail resulting in requests for support. Thus, improvements are to be provided to reduce the number of failed connections and thus, the number of requests for support, and to improve processing within the computing environment by reducing the number of failed connections.

SUMMARY

Shortcomings of the prior art are overcome, and additional advantages are provided through the provision of a computer-implemented method of facilitating processing within a computing environment. The computer-implemented method includes obtaining a connection request from one computing entity. The connection request is a request to connect to another computing entity and includes a requested connectivity protocol configuration. A determination is made as to whether the requested connectivity protocol configuration is a match to a particular connectivity protocol configuration of the another computing entity. Based on determining that the requested connectivity protocol configuration does not match the particular connectivity protocol configuration of the another computing entity, a selected configuration file that matches the requested connectivity protocol configuration is selected from a plurality of configuration files. Based on selecting the selected configuration file, routing of the connection request to a connectivity protocol service corresponding to the selected configuration file is initiated to facilitate establishing a connection between the one computing entity and the another computing entity.

By selecting a selected configuration file based on there not being a match, the connection process continues, instead of failing. This improves connection processing within the computing environment.

In one embodiment, based on determining that the requested connectivity protocol configuration does not match the particular connectivity protocol configuration, a check is made as to whether the plurality of configuration files includes a configuration file that matches the requested connectivity protocol configuration. The selecting is performed based on the plurality of configuration files including the configuration file that matches the requested connectivity protocol configuration. The configuration file is the selected configuration file. The use of a plurality of configuration files and the selecting of a selected configuration file based on there not being a match, improves connection processing by increasing the chances of a successful connection.

In one embodiment, based on the plurality of configuration files not including a matching configuration file to the requested connectivity protocol configuration, a failed connection indication is provided to the one computing entity. This enables the one computing entity to take action, e.g., automatically, to establish a connection with the another computing entity.

In one embodiment, based on the failed connection indication, another connection request including another requested connectivity protocol configuration determined based on historical configuration usage data of the one computing entity is obtained from the one computing entity. Based on obtaining the another connection request, connection processing is performed. This enables the connection process to automatically continue, increasing the chances of a successful connection and reducing the time to obtain a successful connection.

In one embodiment, the determining whether the requested connectivity protocol configuration matches the particular connectivity protocol configuration of the another computing entity includes performing one or more validations of protocol version and key exchange techniques. Based on the one or more validations being successful, there is the match.

In one embodiment, the connection between the one computing entity and the another computing entity is established. The establishing the connection includes starting the connectivity protocol service based on the selected configuration file. This enables a successful connection instead of a failed connection.

In one embodiment, at least, the connectivity protocol service is monitored to determine whether action is to be taken for the connectivity protocol service. This enables the services to be monitored and action to be taken to manage resources of the computing environment.

In one embodiment, the action includes removing the connectivity protocol service. This enables resources of the removed service to be re-allocated within the computing environment, improving processing within the computing environment.

As examples, the one computing entity is a client and the another computing entity is a server.

In one or more examples, the client runs on one computing device and the server runs on another computing device.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
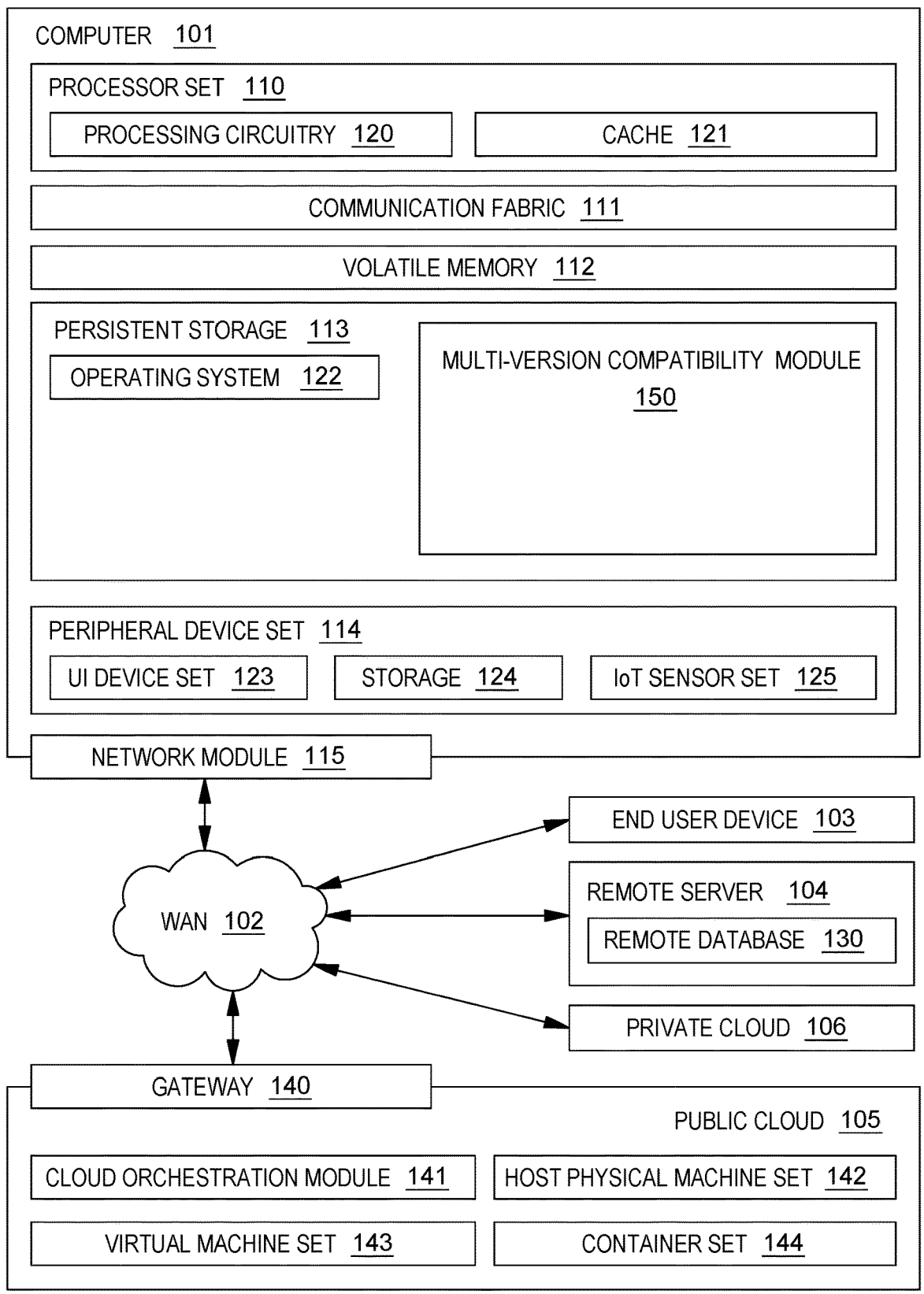
FIG. 1 depicts one example of a computing environment to incorporate and use one or more aspects of the present invention.

In accordance with one or more aspects of the present invention, a capability is provided to facilitate processing within a computing environment. In one or more aspects, the capability includes providing a multi-version compatibility technique to enable successful connections when computing entities with incompatible connectivity protocols (e.g., different versions of a connectivity protocol) attempt to connect.

In one example, the connectivity protocol is Secure Shell (a.k.a., Secure Socket Shell (SSH)); however, one or more aspects of the present invention may apply to additional and/or other connectivity protocols. Examples herein may include and/or refer to the Secure Shell connectivity protocol but this is not meant to be limiting in any way. Other connectivity protocols may be used in the examples and in one or more aspects of the present invention. The connectivity protocol (e.g., Secure Shell or another connectivity protocol) may be used by one or more connectivity tools to facilitate connectivity within a computing environment. In one example, a connectivity tool using a connectivity protocol, such as Secure Shell or another connectivity protocol, provides remote login, as well as encrypts traffic to eliminate eavesdropping and unwanted events, such as improperly taking control of the connections. A connectivity tool may provide a suite of secure tunneling capabilities, several authentication techniques, and sophisticated configuration options.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) to provide (e.g., automatically) successful connections when the computers attempting to connect have incompatible connectivity protocols and/or perform one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as multi-version compatibility code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

In one example, a computing device (e.g., a computer (e.g., computer 101), an end user device (e.g., end user device 103), a remote server (e.g., remote server 104), a processor of a processor set (e.g., processor set 110), a node of a processor of a processor set (e.g., processor set 110) and/or other computing device) may act as a client and/or a server, in which a client requests services of a server that provides services to the client. The client and server connect to one another using a connectivity protocol. This is further described with reference to FIG. 2.

Figure 2:
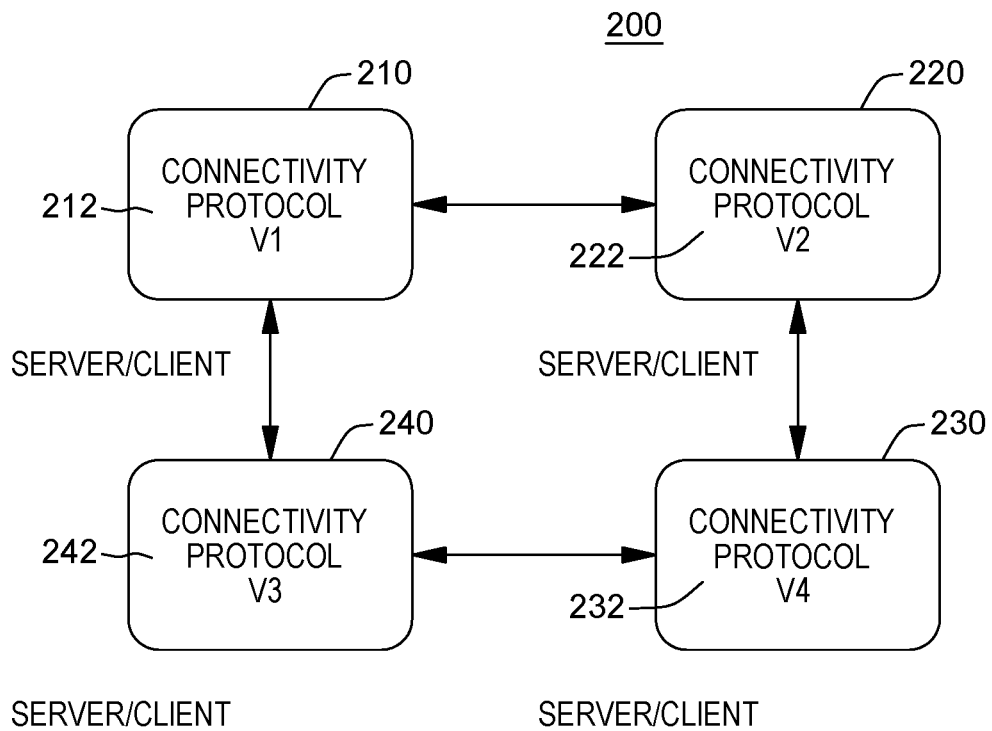
FIG. 2 depicts one example of a plurality of computing entities using different versions of a connectivity protocol, in accordance with one or more aspects of the present invention.

Referring to FIG. 2, in one example, a computing environment 200 includes multiple computing entities connecting to one another using one or more connectivity protocols. For example, a computing entity 210 (e.g., a server/client) uses a connectivity protocol 212 (e.g., Secure Shell or another connectivity protocol) to facilitate connection with one or more other computing entities (e.g., computing entities 220 and 240). Further, in one example, computing entity 220 includes a connectivity protocol 222 (e.g., Secure Shell or another connectivity protocol) that facilitates connection with one or more other computing entities (e.g., computing entities 210 and 230); computing entity 230 includes a connectivity protocol 232 (e.g., Secure Shell or another connectivity protocol) that facilitates connection with one or more other computing entities (e.g., computing entities 220 and 240); and computing entity 240 includes a connectivity protocol 242 (e.g., Secure Shell or another connectivity protocol) that facilitates connection with one or more other computing entities (e.g., computing entities 210 and 230). A computing environment may include additional, fewer and/or other computing entities and/or additional, fewer and/or other computing devices.

The connectivity protocols (e.g., connectivity protocols 212, 222, 232, 242) for the different computing entities may be at one or more different versions or levels. For instance, in the example in FIG. 2, each connectivity protocol is at a different version (e.g., SSH versions 1-4). However, in other examples, one or more of the connectivity protocols may be at the same version or level. This may occur, for example, if the connectivity protocol for one computing entity or device has been upgraded, and therefore, at a new version level, but the connectivity protocol for one or more other computing entities or devices has not been upgraded resulting in computing entities or devices having different connectivity protocol versions. Other examples are possible.

A connectivity protocol includes, for instance, one or more security configurations, one or more authentication techniques, one or more cypher techniques and/or one or more compression techniques that are employed to connect a client running on one computing device and a server running on another computing device (or the same computing device in another example). One or more of these configurations/techniques may be different for different versions of a connectivity protocol. If one or more of these configurations/techniques is different for computing entities (e.g., server, client) attempting to connect, the connection may fail, in one example.

For example, a client may store connection information (e.g., one or more security configurations, one or more authentication techniques, one or more cypher techniques and/or one or more compression techniques) based on previously connecting to a server. If the client attempts to connect again with the same information, but the server connectivity protocol has changed, and thus, at least one of the one or more security configurations, one or more authentication techniques, one or more cypher techniques and/or one or more compression techniques has changed, the connection fails on negotiation because the connectivity protocol of the server is different (e.g., not a match, not compatible). Therefore, in accordance with one or more aspects of the present invention, a multi-version compatibility technique is provided to facilitate successful connections based on a computing entity (e.g., client) using one version of a connectivity protocol requesting a connection with a computing entity (e.g., server) using a different version of the connectivity protocol.

In accordance with one or more aspects of the present invention, to provide multi-version compatibility to facilitate successful connections, a multi-version compatibility module (e.g., multi-version compatibility module 150) is employed. A multi-version compatibility module (e.g., multi-version compatibility module 150) includes code or instructions used to perform multi-version compatibility processing, in accordance with one or more aspects of the present invention. A multi-version compatibility module (e.g., multi-version compatibility 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and may be executed by and/or using one or more computing devices (e.g., one or more computers, such as computer(s) 101; one or more end user devices, such as end user device(s) 103; one or more servers, such as remote server(s) 104; one or more processors or nodes, such as processor(s) or node(s) of processor set 110; and/or processing circuitry, such as processing circuitry 120 of processor set 110; and/or other computing devices.) Additional and/or other computers, end-user devices, servers, processors, nodes, processing circuitry and/or other computing devices may be used to execute one or more of the sub-modules and/or portions thereof. Many examples are possible.

Figure 3:
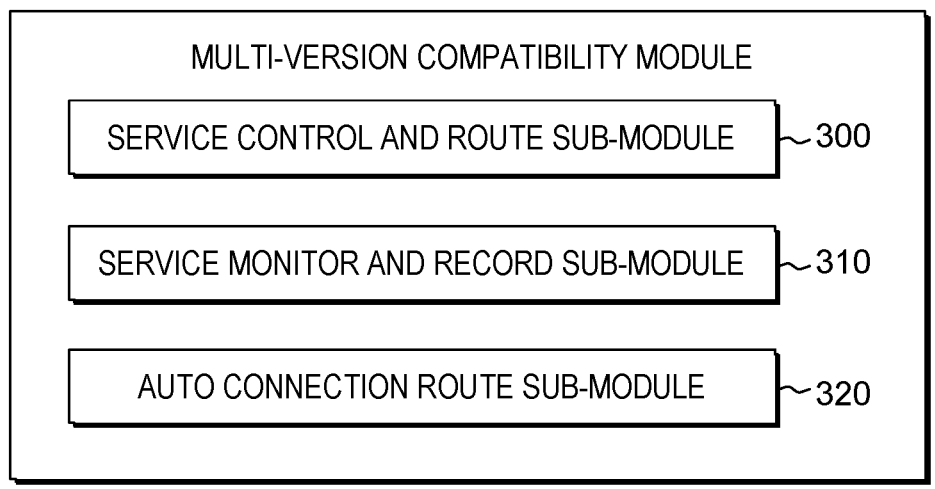
FIG. 3 depicts one example of sub-modules of a multi-version compatibility module of FIG. 1, in accordance with one or more aspects of the present invention.

One example of multi-version compatibility module 150 is described with reference to FIG. 3. In one example, multi-version compatibility module 150 includes a service control and route sub-module 300 to manage resource usage/distribution of the connectivity protocol (e.g., ssh) services; a service monitor and record sub-module 310 to monitor and record the status of the services; and an auto connection route sub-module 320 to monitor client connectivity protocol connections (e.g., client ssh connections) and to take over responses (e.g., failed connection responses) from servers. Additional, fewer and/or other sub-modules may be provided and/or used in one or more aspects of the present invention. Further details relating to these sub-modules are described with reference to FIG. 4.

Figure 4:
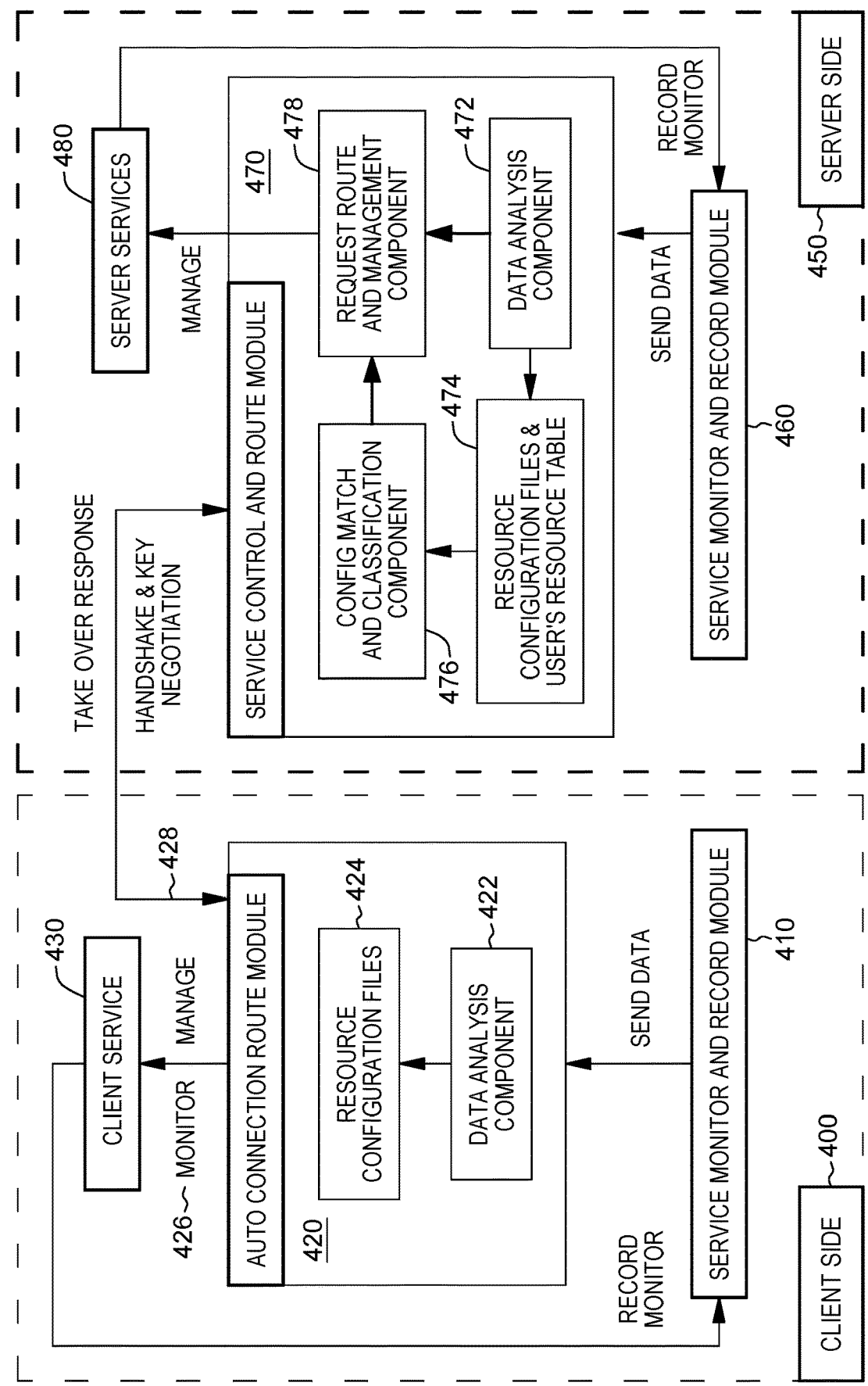
FIG. 4 depicts one example of further details of the sub-modules of FIG. 3, in accordance with one or more aspects of the present invention.

Referring to FIG. 4, in one example, one or more of the sub-modules may execute on a client side (also referred to as client) 400 and/or a server side (also referred to as a server) 450. For instance, client 400 includes a service monitor and record module 410 (e.g., service monitor and record sub-module 310) that monitors and records the status of the client services. It collects data based on the connectivity services (e.g., ssh services) being used in client side 400. The data includes, for instance, who has used the services, when the connection is inactive, the protocol version, the configurations used in the services, etc. The data is collected and processed by service monitor and record module 410, which then sends the data to an auto connection route module 420 (e.g., auto connection route sub-module 320). As an example, service monitor and record module 410 sends the data to a data analysis component 422 of auto connection route module 420, which collects user's historical usage data.

Data analysis component 422 collects data relating to usage of the services by the client. That data is used to update one or more resource configuration files 424 of auto connection route module 420. Resource configuration files 424 include one or more configuration files of the client. In one example, resource configuration files 424 include a plurality of configuration files including a plurality of client connection configurations.

Auto connection route module 420 is, for instance, a shell plugin, used to monitor 426 the client ssh connections and take over responses 428 from servers, such as failed responses. For example, if a connection ultimately fails since the client connectivity protocol (e.g., Secure Shell at one version) is incompatible (e.g., not a match) with the server connectivity protocol (e.g., Secure Shell at another version), a failed response is sent to auto connection route module 420. Auto connection route module 420 then takes action, such as searches for a client configuration file having a configuration that may be used to resend a connection request. The auto connection route module restarts another version (e.g., an older or different version) of the ssh client.

On server side 450, in one example, there is a service monitor and record module 460 (e.g., service monitor and record sub-module 310) that collects data and sends it to a service control and route module 470 (e.g., service control and route sub-module 300). Service monitor and record module 460 monitors and records the status of the server services. It collects data based on the ssh services being used in server side 450. The data includes, for instance, who has used the services, when the connection is inactive, the connectivity protocol (e.g., ssh) version, the configurations used in the services, etc. The data is collected and processed by service monitor and record module 460, which then sends the data to, e.g., a data analysis component (e.g., a data analysis component 472) of a service control and route module (e.g., service control and route module 470).

Service control and route module 470 is, for instance, a server daemon provided in server side 450 to manage, for example, the start, stop, status and resource distribution of the connectivity protocol (e.g., ssh) services. Service control and route module 470 includes data analysis component 472 which collects the user's historical usage data and assists service control and route module 470 to create and maintain a resource configuration file for proper resource distribution. Data analysis component 472 collects data from, e.g., service monitor and record module 460, which is used to update one or more resource configuration files and a user's resource table (e.g., resource configuration files and user's resource table 474).

Resource configuration files and user's resource table 474 is created and maintained by service control and route module 470 and used to manage the resource usage for the ssh services. In this file, as an example, central processing unit (CPU) priority, maximum allowed threads, memory distribution, etc. are set. Multiple configurations files are provided for different sshd (Secure Socket Shell daemon) versions.

One example of a resource configuration file and a user's resource file are provided below:
Resource configuration file:
{
"Version": 2.0

"Ciphers": [
  "aes128-cbc",
  "aes192-cbc",
  "aes128-ctr",
  "aes192-ctr",
]
"KexAlgorithms": [
  "curve25519-sha256",
  "diffie-hellman-group1-sha1",
  "diffie-hellman-group-exchange-sha1",
  "diffie-hellman-group-exchange-sha256"
],
"MACs": [
  "hmac-md5",
  "hmac-md5-96",
  "hmac-sha1",
  "hmac-sha1-96"
]}
User's resource file:
{
"user": "limin",
"id": "099992"
{
  "config": "config1"
  "resources": {
[
  {"uuid": 2098765671
    "max cpu: "5%",
    "max memory": "2G",
    "min cpu: "1%",
    "min memory": "500M",
    "start time": 2022/08/13 17:00:09,
    "end time": 2022/08/13 22:00:09},
  {"uuid": 2098765671
    "max cpu: "5%",
    "max memory": "2G",
    "min cpu: "1%",
    "min memory": "500M",
    "start time": 2022/08/16 19:00:09,
    "end time": 2022/08/17 22:00:09},
  . . .
]
}
{
"config":"config2"
"resources": {
  . . .
}
}
. . .
{

Additional and/or other configuration files and/or resource files/tables may be provided.

Resource configuration files and user's resource table 474 are used by a configuration match and classification component (e.g., configuration match and classification component 476) of service control and route module 470 to match, using predefined rules, the sshd configuration and system resource configuration for the user. A matched configuration from configuration match and classification component 476 is provided to a request route and management component (e.g., request route and management component 478) of service control and route module 470, which routes the request to the corresponding sshd service and manages the life cycle of the sshd. Request route and management component 478 is configured to send a request to one of a plurality of sshd services.

In one example, service control and route module 470 on server side 450 performs handshake and key negotiation with auto connection route module 420 on client side 400 based on receiving a connection request from a client. The connection request specifies a version of a client connectivity protocol to be used to connect to the server. The negotiation takes place to determine if the request is valid, i.e., to determine whether the client can connect to the server.

Figure 5:
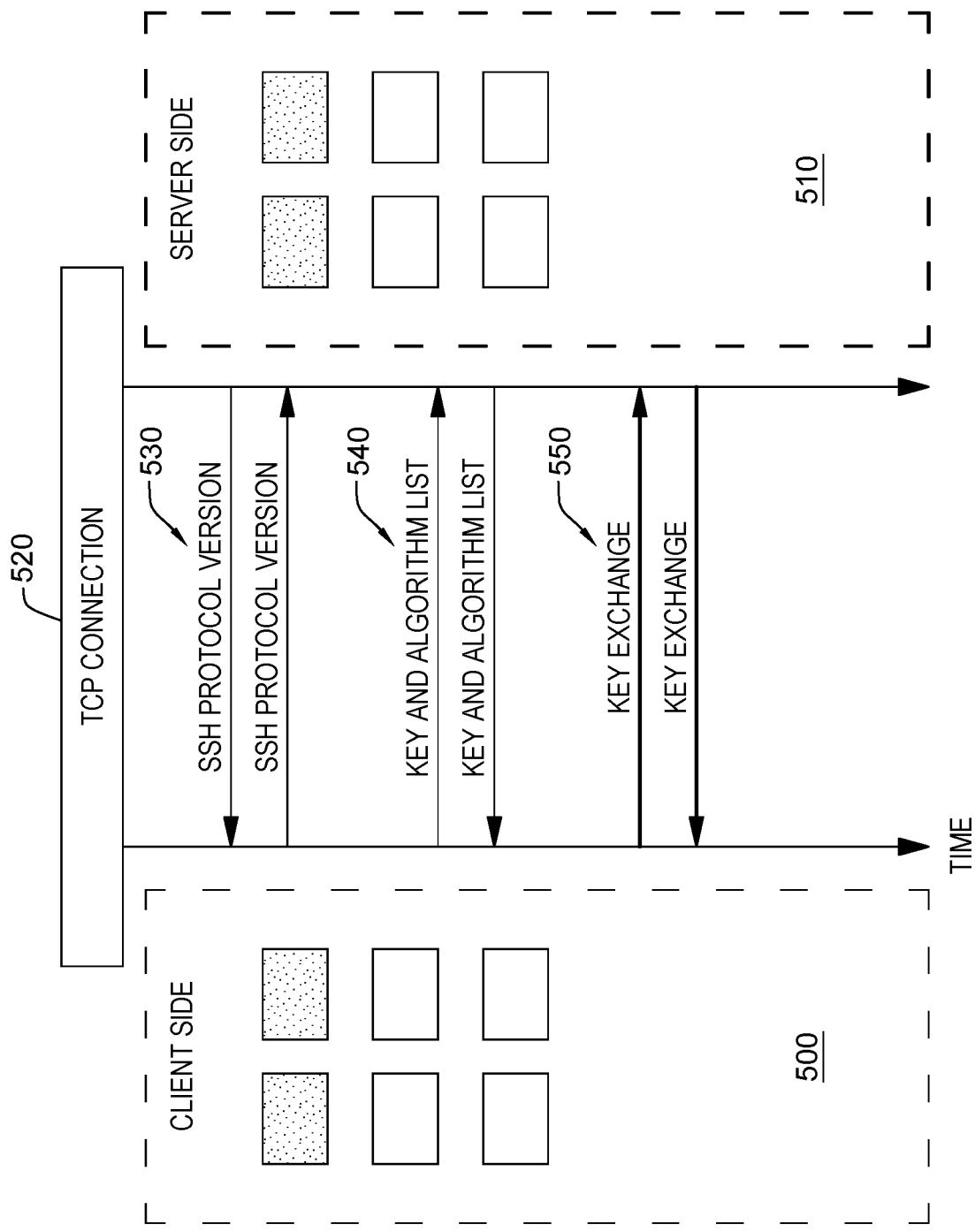
FIG. 5 depicts one example of a key exchange for a connectivity protocol, in accordance with one or more aspects of the present invention.

One example of the negotiation process is described with reference to FIG. 5. A client side 500 (e.g., client side 400) communicates with a server side 510 (e.g., server side 450) via one or more connections 520, such as one or more Transmission Control Protocol (TCP) connections. In this example, there are three phases of the negotiation including, for instance, a protocol version exchange phase 530 in which each side provides its protocol version; a key and algorithm list exchange phase 540 that commences based on a validation of the protocol version phase and includes an exchange of, e.g., one or more algorithms or techniques; and a key exchange phase 550 that commences based on a validation of the key and algorithm(s) phase and includes an exchange of one or more keys (e.g., used in cryptographic operations). If the negotiation is successful, the connection is established.

In one example, the keys are exchanged if the client requested connectivity protocol matches the server (e.g., main, default) connectivity protocol. The protocols are considered a match if one or more predefined rules are satisfied. For instance, if the protocol versions are the same and the exchange of the key and algorithm or technique list is validated (e.g., considered compatible or valid based on one or more predetermined rules (e.g., they are the same, they are similar within a threshold, etc.), the client requested connectivity protocol is a match to the server connectivity protocol. Additional, fewer and/or other predefined rules may be used to determine whether the protocols or configurations match. Many variations are possible.

Further details relating to the negotiation and additional processing of a configuration match and classification component (e.g., configuration match and classification component 476) of a service control and route module (e.g., service control and route module 470; service control and route sub-module 300) are described with reference to FIG. 6. The processing (e.g., a process used to perform the processing) is executed, in one or more examples, by one or more computing devices, such as one or more computers (e.g., computer 101, other computer(s), etc.), one or more servers (e.g., remote server 104, other server(s), etc.), one or more end user devices (e.g., end user device 103, other device(s), etc.), one or more processors and/or processing circuitry (e.g., of processor set 110 or other processor sets), one or more nodes of a processor, etc. Although example computing devices are provided, additional, fewer and/or other computing devices may be used for the process/processing to perform configuration match and classification. Various options are possible.

Figure 6:
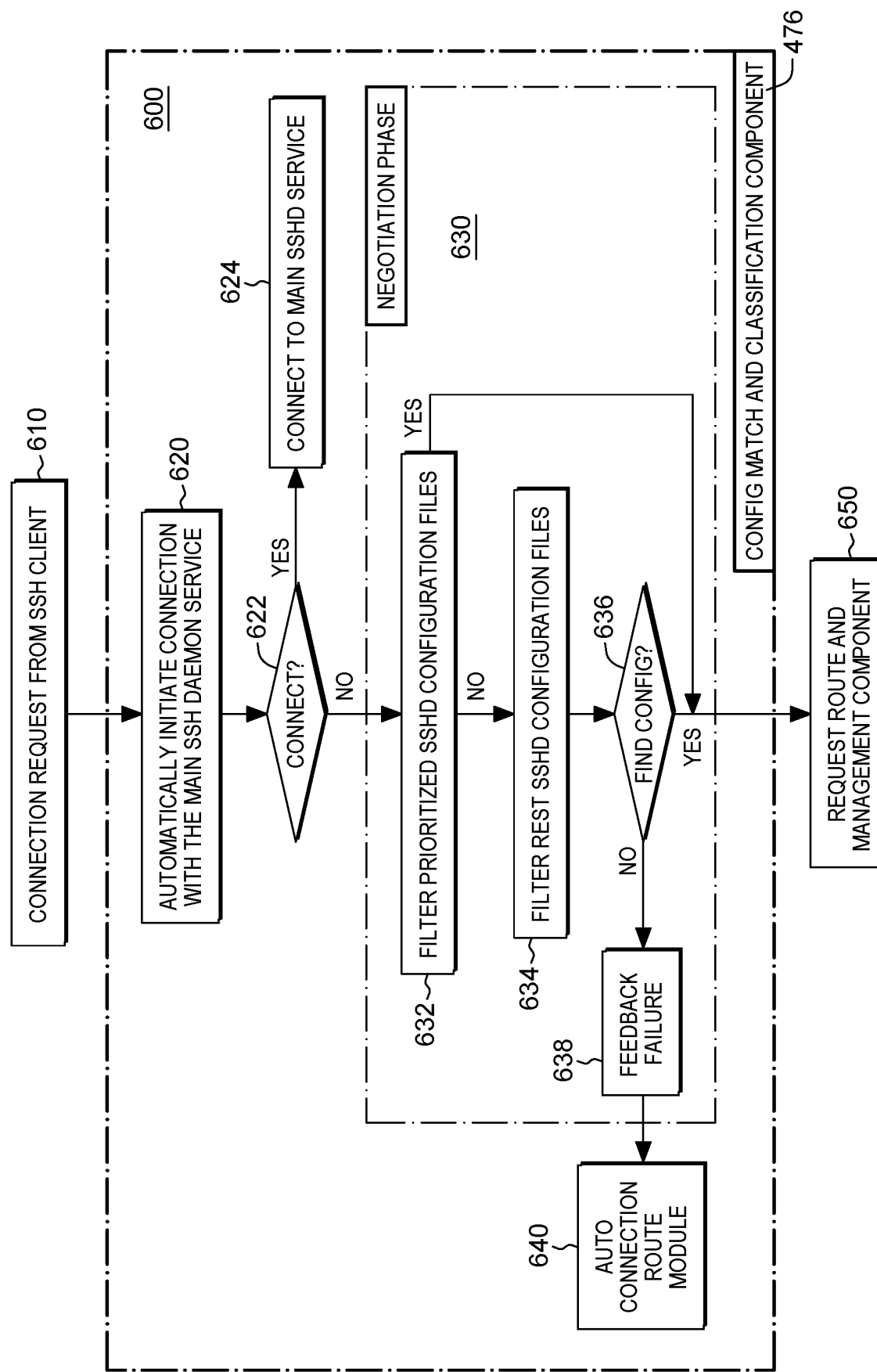
FIG. 6 depicts one example of processing of a configuration match and classification component of a service control and route sub-module of FIG. 3, in accordance with one or more aspects of the present invention.

Referring to FIG. 6, in one example, a configuration match and classification process 600 of a configuration match and classification component (e.g., configuration match and classification component 476) is responsible for processing connection requests 610 from a client connectivity protocol (e.g., ssh client). The processing includes, for instance, filtering the server connectivity protocol (e.g., sshd) configuration files during the handshaking phases, if a connection cannot initially be made, as described herein.

In one example, based on obtaining (e.g., receiving, being provided, retrieving, fetching, etc.) a connection request from a connectivity protocol of a client (e.g., ssh client), process 600 automatically initiates connection processing 620 with the main server daemon connectivity protocol service (e.g., main sshd service). This includes determining 622 whether a connection may be made (e.g., was the negotiation (see, e.g., FIG. 5) between the client and the server successful?). If, for instance, the protocol versions, key and algorithm lists and key exchanges of the negotiation process were successful, connection 624 is made to the main server daemon connectivity protocol service (e.g., sshd service). In one example, a request route and management component (e.g., request route and management component 478) may be used to make the connection. However, if the negotiation is unsuccessful and a connection is not to be made, then further negotiation processing is performed during a negotiation phase 630.

As an example, in accordance with an aspect of the present invention, negotiation phase 630 includes filtering 632 prioritized configuration files of a daemon connectivity protocol service (e.g., sshd service) to search configuration files of currently running services (other than the main service) for a configuration that matches the requested configuration of the client. For example, a selected configuration file of the prioritized configuration files matches the requested configuration based on satisfying one or more predefined rules. The predefined rules include, e.g., matching of version numbers, validating key and algorithm/technique lists, and/or other rules. If there is no match in the prioritized configuration files, then, in one example, negotiation phase 630 filters 634 remaining configuration files of the daemon connectivity protocol service (e.g., sshd service) to look for a match (e.g., based on predefined rules) to the client request. Process 600 determines 636 whether a configuration match was located during negotiation phase 630. If a configuration match was not found, feedback is provided 638 to the client (e.g., an auto connection route module 640; e.g., auto connection route module 420) indicating a failed connection.

Returning to filtering 632, 634, should a prioritized configuration file or another configuration file be a match, process 600 provides 650 an indication of the configuration file match to a request route and management component (e.g., request route and management component 478) used to route the request to an appropriate server daemon (e.g., sshd). For example, if a prioritized configuration file is selected, the request is routed to a server daemon currently running that corresponds to the selected prioritized configuration file. If a non-prioritized configuration file is selected, a new sshd is started (e.g., using request route and management component 650) and the request is routed to that ssh daemon.

Further details relating to processing of a request route and management component (e.g., request route and management component 478) are described with reference to FIG. 7. The processing (e.g., a process used to perform the processing) is executed, in one or more examples, by one or more computing devices, such as one or more computers (e.g., computer 101, other computer(s), etc.), one or more servers (e.g., remote server 104, other server(s), etc.), one or more end user devices (e.g., end user device 103, other device(s), etc.), one or more processors and/or processing circuitry (e.g., of processor set 110 or other processor sets), one or more nodes of a processor, etc. Although example computing devices are provided, additional, fewer and/or other computing devices may be used for the process/processing to perform routing and management. Various options are possible.

Figure 7:
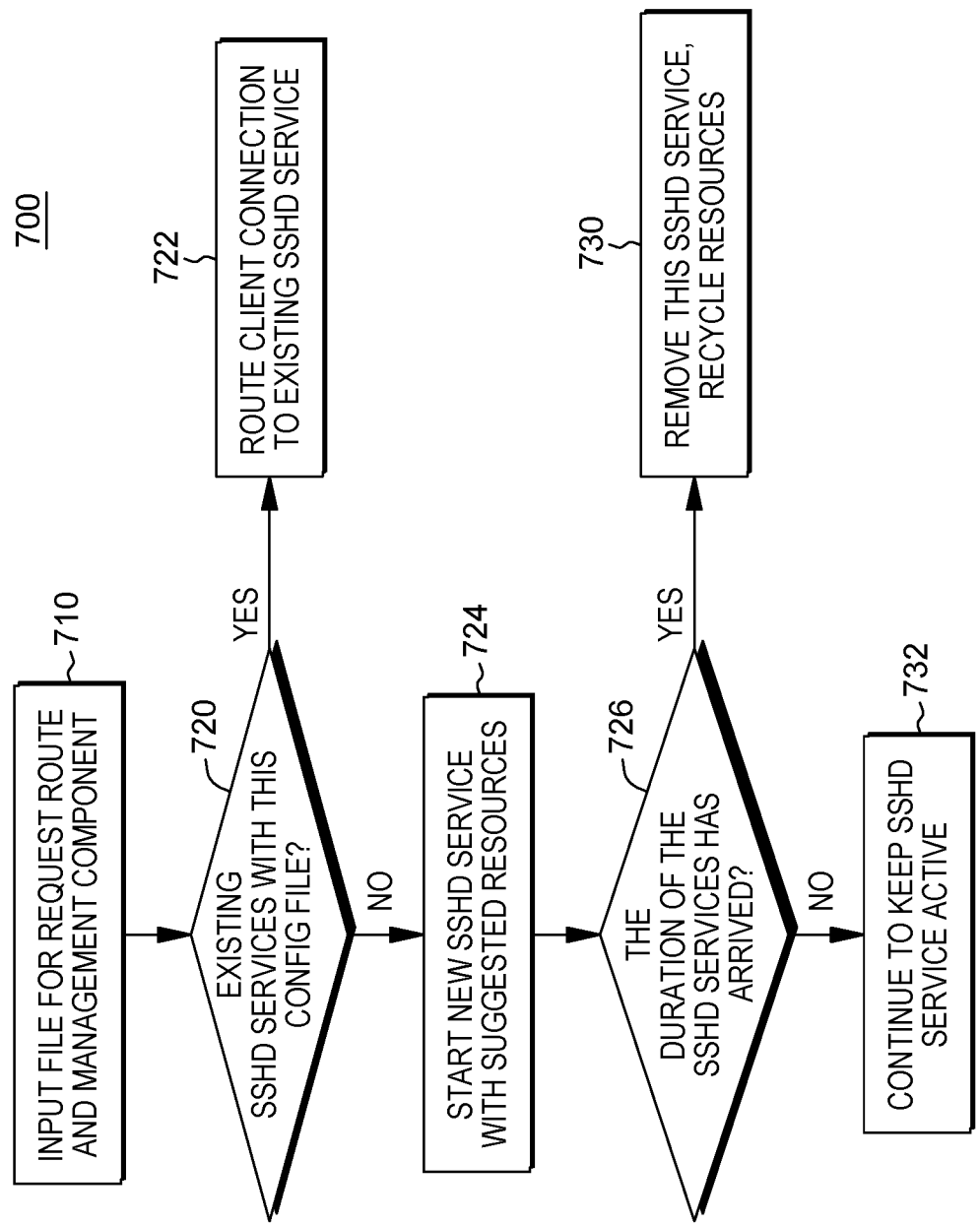
FIG. 7 depicts one example of processing of a request route and management component of a service control and route sub-module of FIG. 3, in accordance with one or more aspects of the present invention.

Referring to FIG. 7, a request route and management process 700 obtains 710 an input file from a configuration match and classification component (e.g., configuration match and classification component 476). The input file is, for instance, the matched configuration file located during the negotiation phase. One example of an input configuration file, includes:

{"Configuration file":{
  "Version": 2.0,
  "Ciphers": ["aes128-cbc", "aes192-cbc", "aes128-ctr", "aes192-ctr"],
  "KexAlgorithms": ["curve25519-sha256", "diffie-hellman-group1-sha1", "diffie-hellman-group-exchange-sha1", "diffie-hellman-groupexchange-sha256"],
  "MACs": ["hmac-md5", "hmac-md5-96", "hmac-sha1", "hmac-sha1-96"] }
  "Resource file": {
    "user": "limen",
    "resources": {
      "cpu": "5%",
      "memory": "2G"
    }
    "Duration": 2h
  }
}

Based on obtaining the input configuration file, process 700 determines 720 whether there are existing connectivity protocol services (e.g., sshd) with this configuration file. Should there be an existing connectivity protocol service (e.g., sshd) with this configuration file, then process 700 routes 722 the client connection to the existing connectivity protocol service. However, if there is no existing connectivity protocol service with the configuration file, process 700 starts 724 a new connectivity protocol service (e.g., sshd) with the resources suggested in the configuration file.

Moreover, in one example, process 700 determines 726 whether one or more of the services (e.g., the newly started sshd services and/or other services, except the main sshd service) have expired. If one or more of the services have expired, process 700 removes 730 the service and the resources are recycled. However, if one or more of the services have not expired, process 700 continues 732 to maintain the services.

Figure 8:
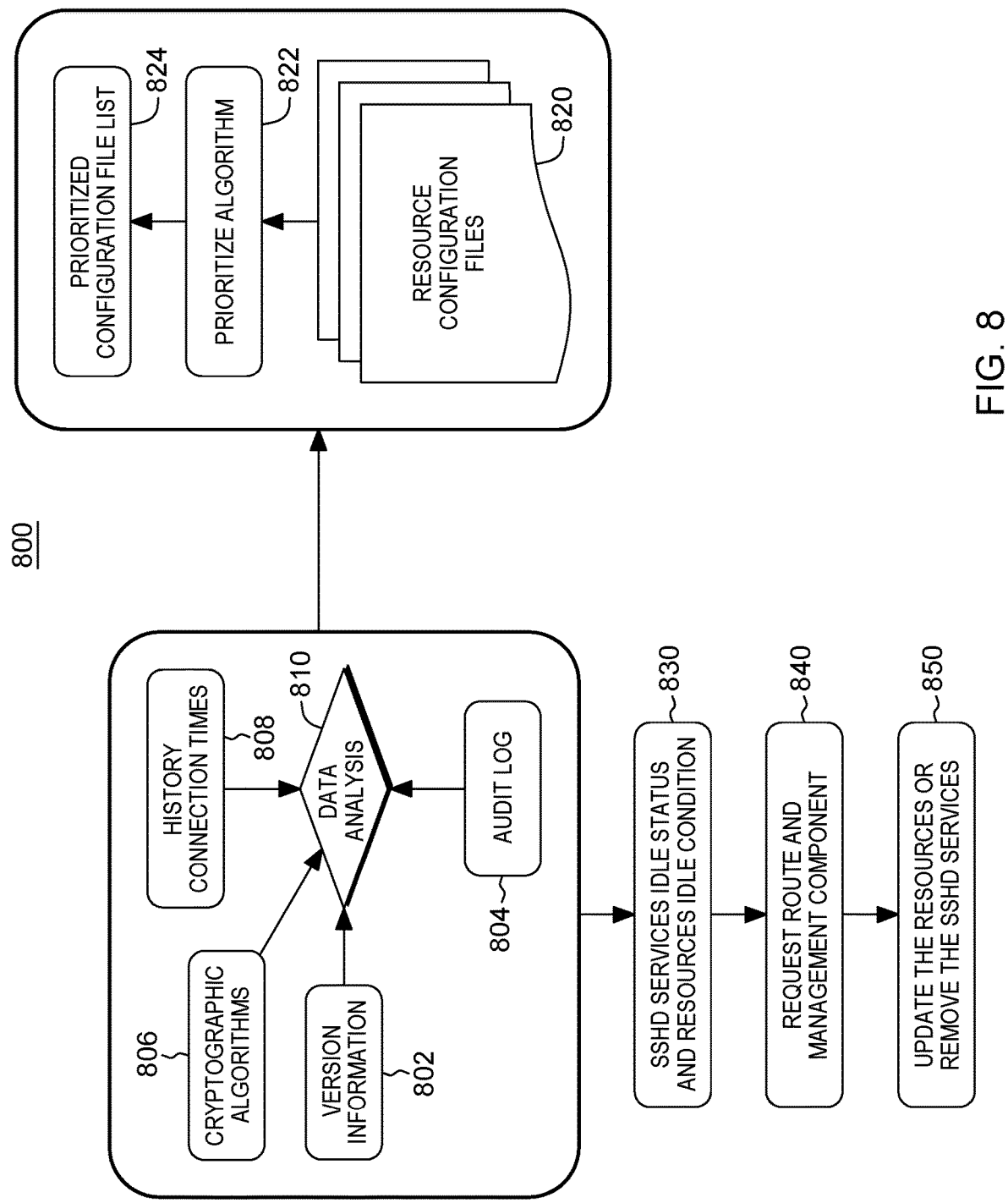
FIG. 8 depicts one example of processing of a data analysis component of a service control and route sub-module of FIG. 3, in accordance with one or more aspects of the present invention.

As indicated, in one example, a request route and management component (e.g., request route and management component 478) is responsible for managing the services, in addition to performing the routing. To perform one or more management aspects, request route and management component 478 obtains (e.g., receives, is provided, retrieves, fetches, etc.) data from a data analysis component (e.g., data analysis component 472) to be used in the managing. One example of processing of a data analysis component (e.g., data analysis component 472 of service control and route module 470) is described with reference to FIG. 8. The processing (e.g., a process used to perform the processing) is executed, in one or more examples, by one or more computing devices, such as one or more computers (e.g., computer 101, other computer(s), etc.), one or more servers (e.g., remote server 104, other server(s), etc.), one or more end user devices (e.g., end user device 103, other device(s), etc.), one or more processors and/or processing circuitry (e.g., of processor set 110 or other processor sets), one or more nodes of a processor, etc. Although example computing devices are provided, additional, fewer and/or other computing devices may be used for the process/processing to perform data analysis. Various options are possible.

In one example, a data analysis process 800 employs various information, including, for instance, connectivity protocol version information 802, an audit log 804, an indication of one or more cryptographic algorithms 806 and/or a history of connection times 808 to perform 810 data analysis. Analysis 810 provides output used to update, for instance, one or more resource configuration files 820 of, e.g., resource configuration files and user's resource table 474. Further, a prioritize algorithm 822 is executed to provide a prioritized configuration file list 824 that indicates, e.g., the currently provided server services. There may be one or more currently executing services to which connection requests may be routed.

Additionally, in one aspect, analysis 810 provides status 830 (e.g., idle status) for server services (e.g., sshd services) and a condition (e.g., idle) of the resources. This status/condition information is provided 840 to a request route and management component (e.g., request route and management component 478) and the request route and management component (e.g., request route and management component 478) manages the services and/or the resources. For example, the resources of the server services (e.g., sshd services) are updated 850 or one or more server services are removed. Other examples are possible.

In one example, data analysis component 472, as well as data analysis component 422, obtains data from a service monitor and record module (e.g., service monitor and record module 460, 410, respectively; service monitor and record sub-module 310). Each data analysis component 472, 422 analyzes the data, and in one example, the analyzed data is used to update one or more resource configuration files, such as resource configuration files 474, 424, respectively.

Figure 9:
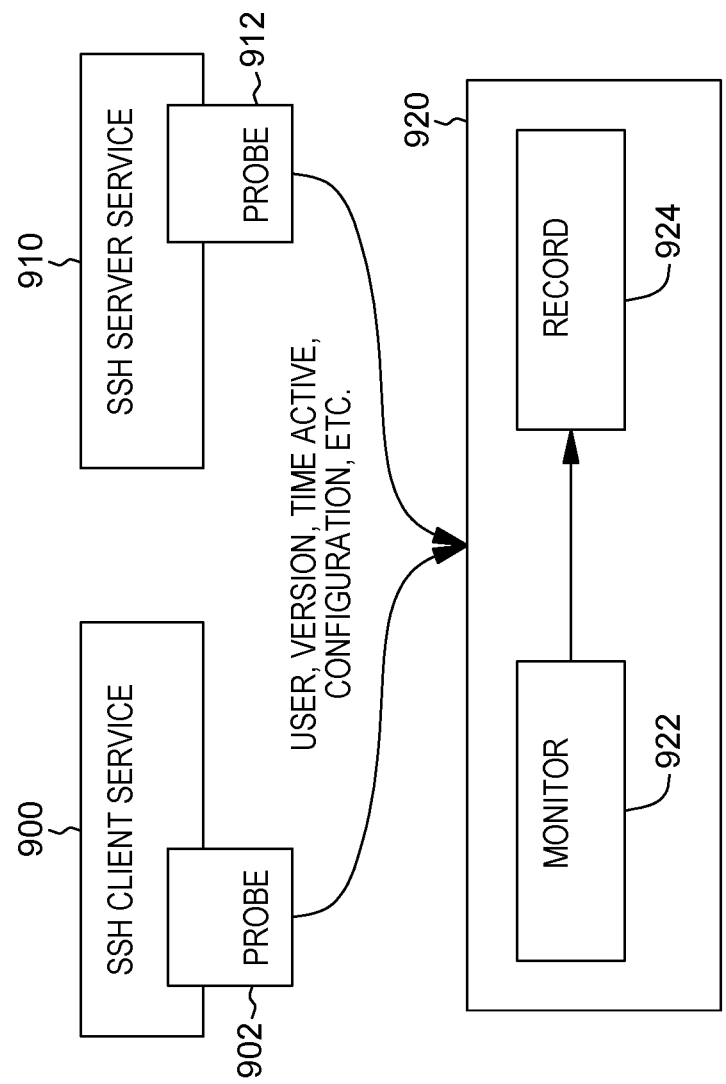
FIG. 9 depicts one example of processing of a service monitor and record sub-module of FIG. 3, in accordance with one or more aspects of the present invention.

One example of processing of a service monitor and record module (e.g., service monitor and record module 410, 460; service monitor and record sub-module 310) is further described with reference to FIG. 9. The processing (e.g., a process used to perform the processing) is executed, in one or more examples, by one or more computing devices, such as one or more computers (e.g., computer 101, other computer(s), etc.), one or more servers (e.g., remote server 104, other server(s), etc.), one or more end user devices (e.g., end user device 103, other device(s), etc.), one or more processors and/or processing circuitry (e.g., of processor set 110 or other processor sets), one or more nodes of a processor, etc. Although example computing devices are provided, additional, fewer and/or other computing devices may be used for the process/processing to perform monitoring and recording. Various options are possible.

In one example, a service monitor and record process 920 includes monitoring 922 data (e.g., user, version of the connectivity protocol, time the connection is active, configuration, etc.) of a client service 900 and/or a server service 910. In one example, a client side probe 902 is used to monitor the connectivity connection of the client and obtain data relating thereto, and a server side probe 912 is used to monitor the connectivity connection of the server and obtain data relating thereto. Service monitor and record process 920 records 924 the obtained information.

One example of a client record stored using service monitor and record process 920 is depicted below:
Client record:
{
"Server": "9.10.1.101",
"ClientVer": "8.2",
"User": "limin",
"ssh_config": "/etc/ssh/ssh_configA",
"Connected": true,

```
"configuration": [{
    "Ciphers": aes128-cbc',
    "compression":'zlib'
}]
"Duration": [{
    "start": '2022-08-30 8:45:36',
    "end": '2022-08-30 10:45:36'
}]
}
```

One example of a server record stored using service monitor and record process 920 is depicted below:

```
Server record:
{
"Client": "9.57.1.105",
"ServerVer": "8.4",
"User": "limin",
"sshd_config": "/etc/ssh/sshd_config1",
"Connected": true,
"configuration": [{
    "Ciphers": 'aes128-cbc',
    "compression": 'zlib'
}]
"Duration": [{
    "start": '2022-08-30 8:45:36',
    "end": '2022-08-30 10:45:36'
}]
}
```

Figure 10:
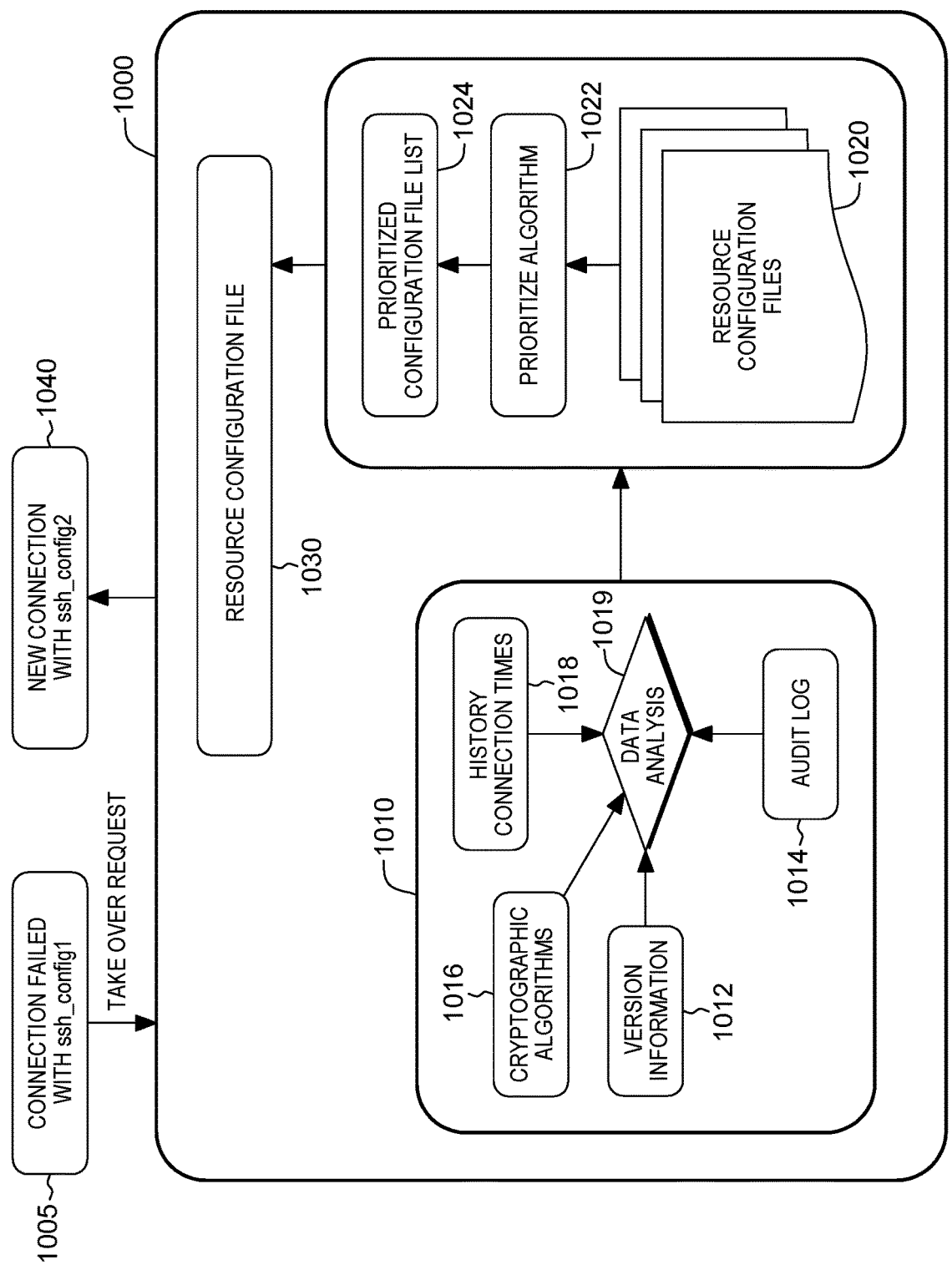
FIG. 10 depicts one example of processing of an auto connection route sub-module of FIG. 3, in accordance with one or more aspects of the present invention.

In one example, on the client side (e.g., client side 400), data from a service monitor and record module (e.g., service monitor and record module 410) is input to an auto connection route module (e.g., auto connection route module 420; auto connection route module sub-module 320) used to monitor client connections (e.g., client ssh connections) and to take over responses (e.g., failed response) from the servers. One example of auto connection route processing is described with reference to FIG. 10. The processing (e.g., a process used to perform the processing) is executed, in one or more examples, by one or more computing devices, such as one or more computers (e.g., computer 101, other computer(s), etc.), one or more servers (e.g., remote server 104, other server(s), etc.), one or more end user devices (e.g., end user device 103, other device(s), etc.), one or more processors and/or processing circuitry (e.g., of processor set 110 or other processor sets), one or more nodes of a processor, etc. Although example computing devices are provided, additional, fewer and/or other computing devices may be used for the process/processing to perform connection route processing. Various options are possible.

In one example, an auto connection route process 1000 obtains 1005 (e.g., receives, is provided, retrieves, fetches, etc.) a connection failed indication that indicates that the client requested connection with a selected connectivity protocol configuration (e.g., ssh_config1) has failed. Based on obtaining the failed indication, auto connection route process 1000 takes action (e.g., automatically) including searching one or more resource configuration files 1020 (e.g., resource configuration files 424) on the client side for another configuration to be used in another connection request, as described below.

In one example, a data analysis component (e.g., data analysis component 1010; data analysis component 422) collects data relating to usage of the services by the client. That data is used to update one or more resource configuration files (e.g., resource configuration files 1020, 424) of an auto connection route module (e.g., auto connection route module 420). Resource configuration files 1020 include one or more resource configuration files of the client. In one example, resource configuration files 1020 include a plurality of configuration files including a plurality of client connection configurations.

As an example, data analysis component 1010 includes various information, such as connectivity protocol version information 1012, an audit log 1014, an indication of one or more cryptographic algorithms 1016 and/or a history of connection times 1018 which are analyzed 1019 to provide output used to update, for instance, one or more resource configuration files 1020. A prioritize algorithm 1022 is executed to provide a prioritized configuration file list 1024 that indicates, e.g., the currently provided client services. From prioritized configuration file list 1024, a resource configuration file 1030 is selected (e.g., based on one or more of: historical client usage, information provided in the failed indication, other data, etc.), and a new connection request 1040 with the new selected resource configuration file 1030 (e.g., ssh_config2) is sent from the client to the server. Connection processing is then performed, as described in one or more examples herein.

One example of the new selected connectivity protocol configuration (e.g., ssh_config2) is depicted below:

```
ssh_config2
{
"Version": 2.0
"Ciphers": [
"aes128-cbc",
"aes192-cbc",
"aes128-ctr",
]
"KexAlgorithms": [
"curve25519-sha256",
"diffie-hellman-group1-sha1",
"diffie-hellman-group-exchange-shat",
"diffie-hellman-group-exchange-sha256"
],
"MACs": [
"hmac-md5",
"hmac-md5-96",
"hmac-sha1",
"hmac-sha1-96"
]}
```

Described herein is one example of a multi-version compatibility technique to be used to successfully establish a connection (e.g., automatically) when computing entities with different versions of connectivity protocols attempt to connect with one another. An example of using this technique is described with reference to FIGS. 11-13.

Figure 11:
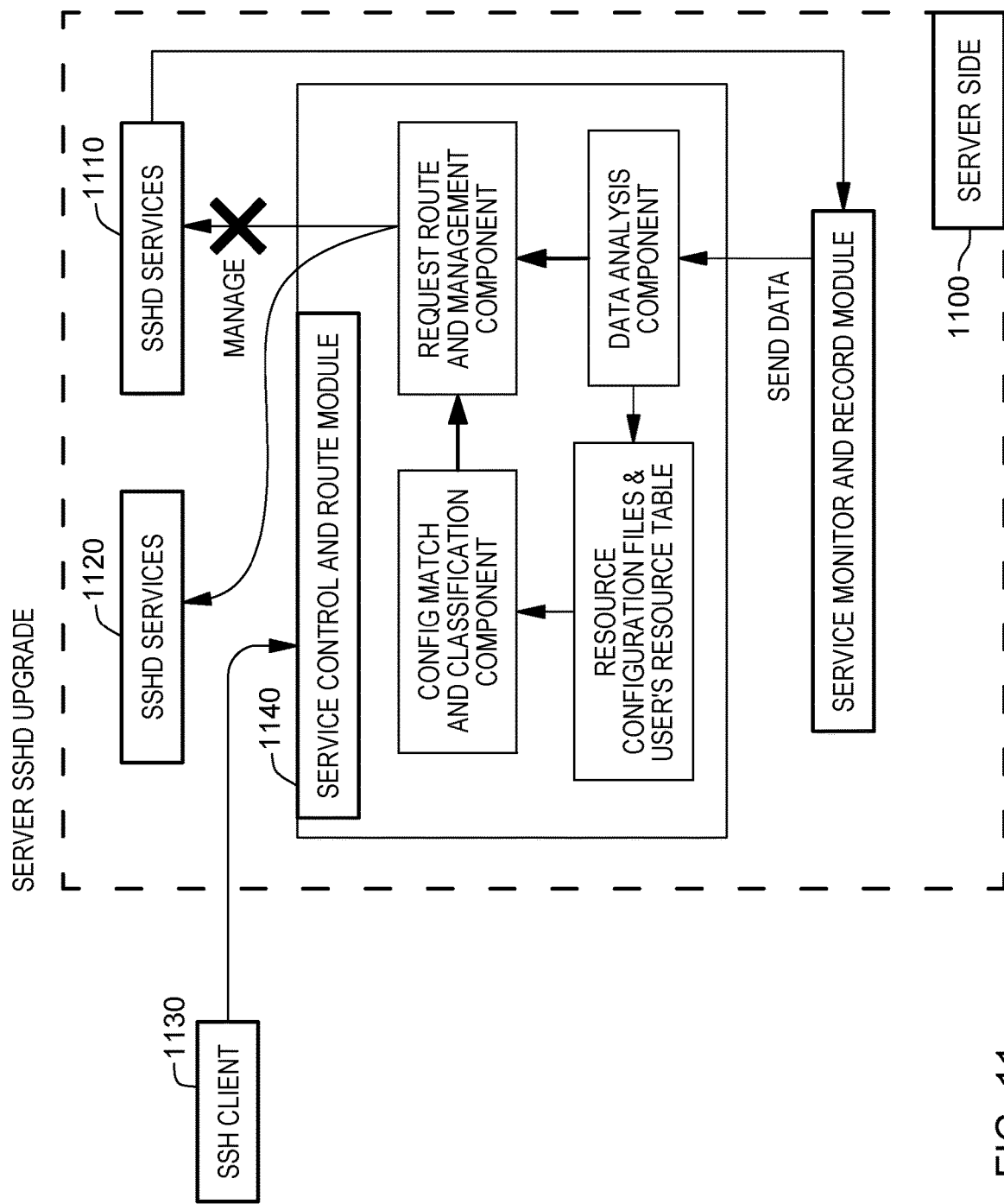
FIGS. 11-12 depict one example of a server connectivity protocol upgrade, in accordance with one or more aspects of the present invention.

Referring to FIG. 11, one example of an upgrade of a server connectivity protocol on a server is depicted. For example, on a server side 1100 (e.g., server side 450), sshd services (e.g., daemon connectivity protocol services) 1110 are no longer used; instead, upgraded sshd services 1120 are used. There may be, in one or more examples, one or more sshd services (e.g., daemon connectivity protocol services) running. When a computing entity, such as ssh client 1130 (or a computing device, etc.), sends a connection request to a service control and route module (e.g., service control and route module 1140; service control and route module 470) on server side 1100, the connection request is to indicate a configuration file that matches the upgraded sshd services 1120 to automatically connect, or processing herein takes place, in accordance with one or more aspects of the present invention. This is further described with reference to FIG. 12.

Figure 12:
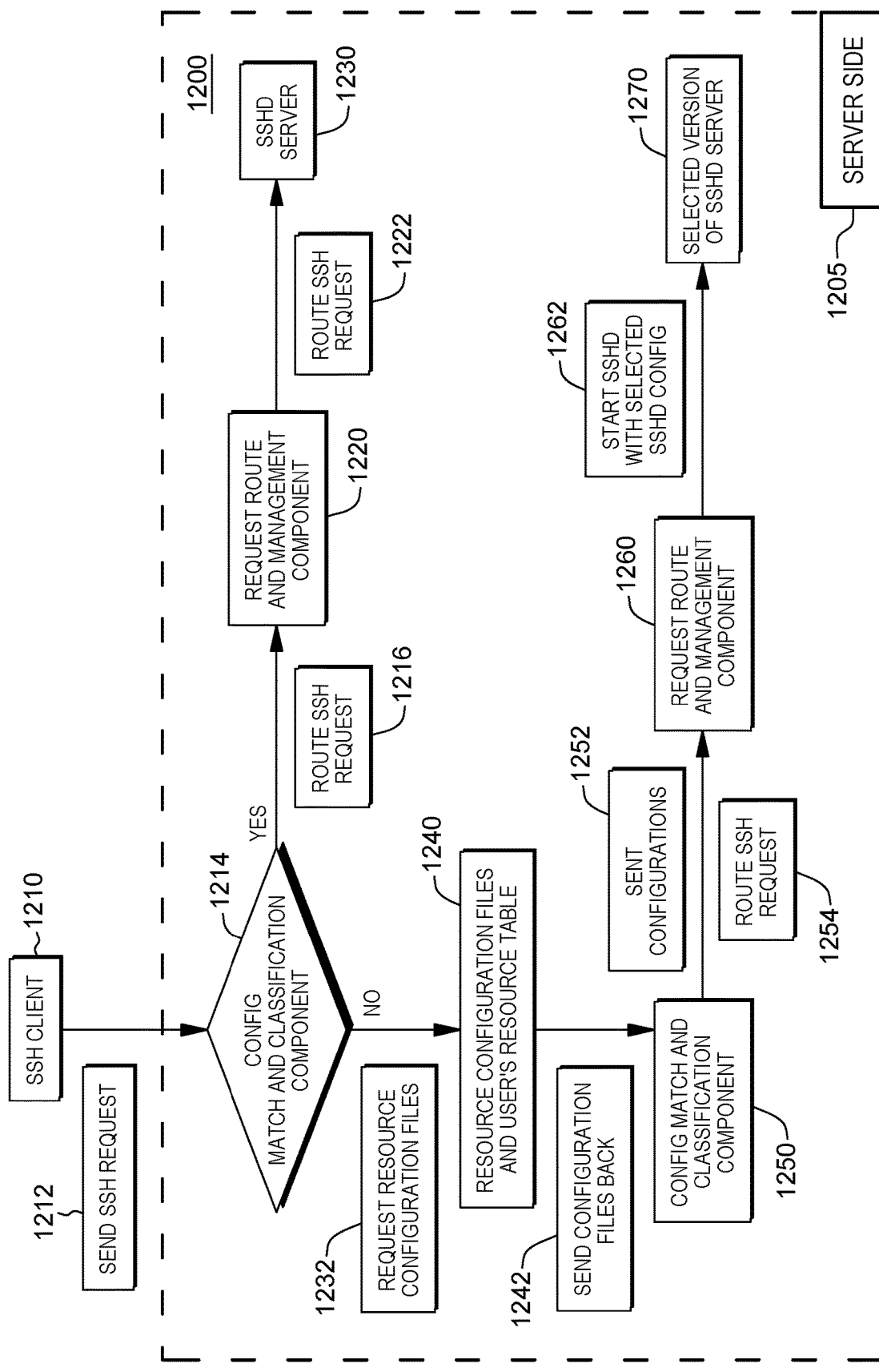

Referring to FIG. 12, one example of server side processing to route a request to one of a plurality of server services (e.g., sshd server; daemon connectivity protocol service) is described. The processing (e.g., a process used to perform the processing) is executed, in one or more examples, by one or more computing devices, such as one or more computers (e.g., computer 101, other computer(s), etc.), one or more servers (e.g., remote server 104, other server(s), etc.), one or more end user devices (e.g., end user device 103, other device(s), etc.), one or more processors and/or processing circuitry (e.g., of processor set 110 or other processor sets), one or more nodes of a processor, etc. Although example computing devices are provided, additional, fewer and/or other computing devices may be used for the process/processing to perform route processing. Various options are possible.

In one example, on server side 1205 (e.g., server side 450), a connectivity request 1212 sent by a client 1210 is received at a server (e.g., server side 1205). In one example, the client connection request is obtained (e.g., received, is provided, retrieved, fetched) by a configuration match and classification component (e.g., configuration match and classification component 476) that determines 1214 whether the main sshd service running in the server matches (e.g., based on predefined criteria) the requested configuration. If there is a configuration match, the ssh request is routed 1216 to, e.g., a request route and management component 1220, which routes 1222 the request to the main sshd server 1230. In another example, the request route and management component is bypassed.

However, if the configuration match and classification component determines 1214 that the requested service is not a match to the main sshd service currently running, then the configuration match and classification component requests 1232 resource configuration files from a resource configuration files and user's resource table 1240 (e.g., resource configuration files and user's resource table 474). The configuration files are searched and a selected configuration file (or multiple configuration files) matching the requested configuration is provided 1242 to a configuration match and classification component 1250 (e.g., configuration match and classification component 476). Based thereon, the obtained configuration file 1252 and the ssh request are routed 1254 to a request route and management component 1260 (e.g., request route and management component 478). Request route and management component 1260 routes the request with the selected sshd configuration to a selected sshd server. In one example, there may be multiple sshd servers (e.g., multiple daemon connectivity protocol services) running, and therefore, the sshd server matching (e.g., based on predefined criteria) the requested service is selected. In one example, request route and management component 1260 starts 1262 a sshd with the selected sshd configuration, assuming it is not already running, providing a selected version 1270 of the sshd server (e.g., a different version). One or more variations are possible.

Figure 13:
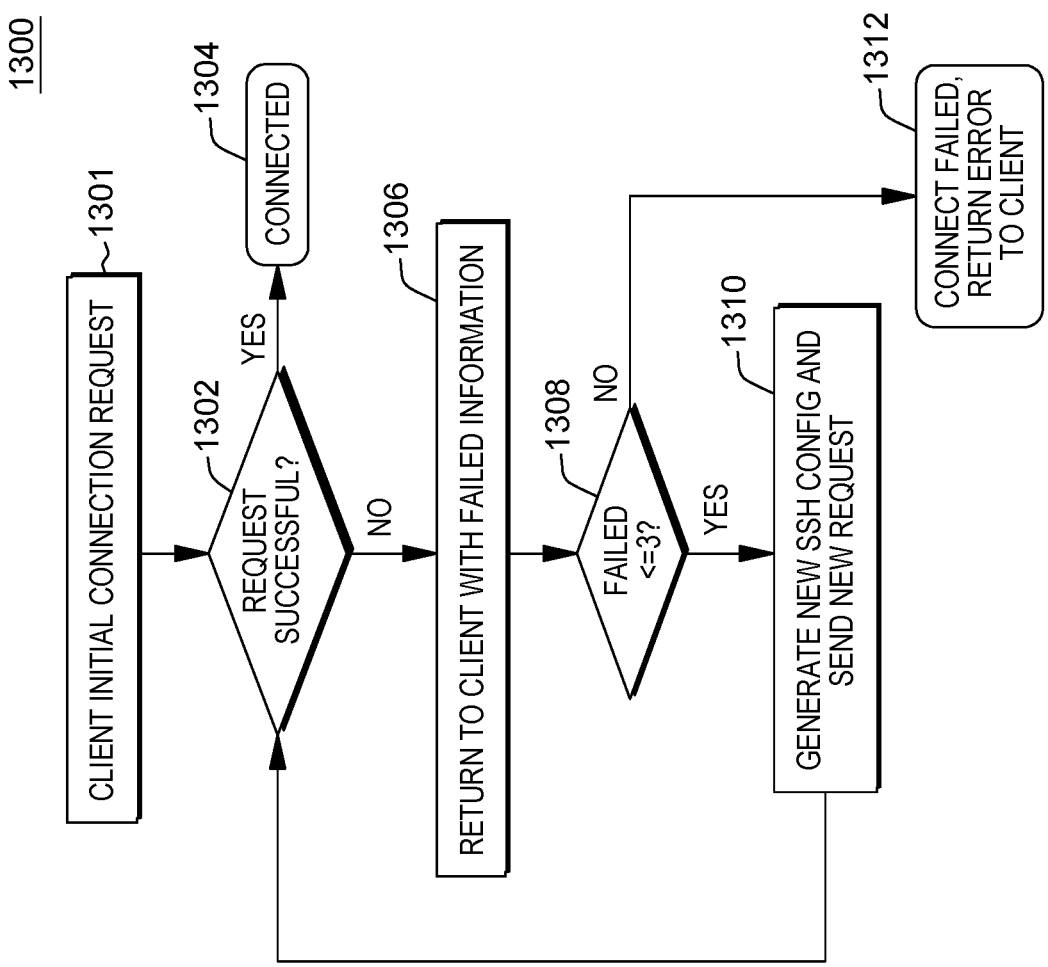
FIG. 13 depicts one example of a client connectivity protocol upgrade, in accordance with one or more aspects of the present invention.

One example of client side request processing, in accordance with one or more aspects of the present invention, is described with reference to FIG. 13. The processing (e.g., a process used to perform the processing) is executed, in one or more examples, by one or more computing devices, such as one or more computers (e.g., computer 101, other computer(s), etc.), one or more servers (e.g., remote server 104, other server(s), etc.), one or more end user devices (e.g., end user device 103, other device(s), etc.), one or more processors and/or processing circuitry (e.g., of processor set 110 or other processor sets), one or more nodes of a processor, etc. Although example computing devices are provided, additional, fewer and/or other computing devices may be used for the process/processing to perform client request processing. Various options are possible.

In one example, on a client side (e.g., client side 400), a client process 1300 initiates 1301 an initial connection request. Client process 1300 determines 1302 whether the request was successful. If the request was successful, the client has been connected 1304. Otherwise, client process 1300 obtains 1306, in one example, failed information from the server indicating the requested connection was unsuccessful. In one example, client process 1300 determines 1308 whether the request failed a predetermined number of times (e.g., more than 3). If it failed more than the predetermined number of times, then client process 1300 returns 1312 an error to the client. However, if the connection request failed less than or equal to the predetermined number of times, client process 1300 generates 1310 a new ssh configuration (e.g., by searching resource configuration files 424) and sends a new request. One or more variations are possible.

Described herein is a multi-version compatibility technique to provide successful connections between one computing entity (e.g., a client) and another computing entity (e.g., a server).

In one aspect, a connection request from one computing entity is obtained. The connection request is a request to connect to another computing entity and includes a requested connectivity protocol configuration. A determination is made as to whether the requested connectivity protocol configuration is a match to a particular connectivity protocol configuration of the other computing entity. Based on determining that the requested connectivity protocol configuration does not match the particular connectivity protocol configuration of the other computing entity, a selected configuration file that matches the requested connectivity protocol configuration is selected from a plurality of configuration files. Based on selecting the selected configuration file, routing of the connection request to a connectivity protocol service corresponding to the selected configuration file is initiated to facilitate establishing a connection between the one computing entity and the other computing entity.

By selecting a selected configuration file based on there not being a match, the connection process continues, instead of failing. This improves connection processing within the computing environment.

In one embodiment, based on determining that the requested connectivity protocol configuration does not match the particular connectivity protocol configuration, a check is made as to whether the plurality of configuration files includes a configuration file that matches the requested connectivity protocol configuration. The selecting is performed based on the plurality of configuration files including the configuration file that matches the requested connectivity protocol configuration. The configuration file is the selected configuration file. The use of a plurality of configuration files and the selecting of a selected configuration file based on there not being a match, improves connection processing by increasing the chances of a successful connection.

In one embodiment, based on the plurality of configuration files not including a matching configuration file to the requested connectivity protocol configuration, a failed connection indication is provided to the one computing entity. This enables the one computing entity to take action, e.g., automatically, to establish a connection with the other computing entity.

In one embodiment, based on the failed connection indication, another connection request including another requested connectivity protocol configuration determined based on historical configuration usage data of the one computing entity is obtained from the one computing entity. Based on obtaining the other connection request, connection processing is performed. This enables the connection process to automatically continue, increasing the chances of a successful connection and reducing the time to obtain a successful connection.

In one embodiment, the determining whether the requested connectivity protocol configuration matches the particular connectivity protocol configuration of the other computing entity includes performing one or more validations of protocol version and key exchange techniques. Based on the one or more validations being successful, there is the match.

In one embodiment, the connection between the one computing entity and the other computing entity is established. The establishing the connection includes starting the connectivity protocol service based on the selected configuration file. This enables a successful connection instead of a failed connection.

In one embodiment, at least, the connectivity protocol service is monitored to determine whether action is to be taken for the connectivity protocol service. This enables the services to be monitored and action to be taken to manage resources of the computing environment.

In one embodiment, the action includes removing the connectivity protocol service. This enables resources of the removed service to be re-allocated within the computing environment, improving processing within the computing environment.

As examples, the one computing entity is a client and the other computing entity is a server.

In one or more examples, the client runs on one computing device and the server runs on another computing device.

In one or more aspects, in one example, prior to, e.g., an upgrade to a server protocol (e.g., ssh), the ssh client uses an ssh_config configuration to initiate an ssh connection request, and the server daemon listens to the server sshd port. After receiving the ssh connection request, it forwards the ssh connection request to sshd. Sshd goes through the typical negotiation and authentication process. After the sshd verification is successful, sshd generates a successful connect record and records the data to a database or file (e.g., resource configuration files and/or user's resource table). The record data includes information, such as the userid of the ssh connection, the client IP address, the ssh protocol version, the authentication techniques, and the negotiated encryption algorithm, compression algorithm, etc., as examples.

After the upgrade, in one example, the server daemon continues to listen on the sshd port. When an ssh client continues to use the ssh_config configuration to initiate an ssh connection request, the daemon forwards the request to sshd for verification. Sshd and the client negotiate the ssh connecting version and algorithm. If sshd does not support the negotiated algorithm, the request is returned to the server daemon, and the client's userid, IP address, ssh protocol version, authentication technique used, supported encryption algorithms and other information are returned to the daemon. The daemon then goes to the database or file to check whether this connection has a successful connection history, according to the records in the database.

If, in one example, there is a history of successful connections in the database, and these historical records are the same (or similar within a threshold, etc.) as the connecting information this time, the daemon evaluates that the ssh connecting is a trusted connect. The daemon starts another version of the sshd (e.g., an older version) and forwards the ssh request to this other version of the sshd for further negotiation and verification. The other version of sshd (e.g., the older version) uses the other version of sshd_config for configuration. After the verification is successful, the other version of sshd may return a message, such as, for instance: "This time the connecting is in compatibility mode, it is recommended to upgrade the ssh client." Sshd records the request, in one example, as a compatibility mode connection.

If, for instance, there is no successful history of access in the database, or the ssh request frequently uses compatibility mode connecting in a predefined time period (e.g., last 3 months or another predefined time period), then the daemon evaluates that the ssh connecting is an untrusted connect. A message may be returned, such as, for instance: "It is recommended to upgrade the ssh client to a specified version."

In one example, if an algorithm negotiation phase (e.g., subsequent to protocol version negotiation phase) ultimately fails, an auto connection route module takes over the connection request. This module analyzes and produces one or more records from a service monitor and record module and updates, e.g., a client ssh configuration file or generates a new configuration file.

Although various examples are provided herein, other examples/embodiments are possible. For instance, connectivity protocols other than ssh may be used. Further, additional, fewer and/or other predefined rules may be used to determine whether there is a match. Moreover, additional, fewer and/or other modules/sub-modules may be used. Other variations are possible.

One or more aspects of the present invention are tied to computer technology and facilitate processing within a computer, improving performance thereof. For instance, processing is improved by enabling successful connections that would otherwise fail. Processing within a processor, computer system and/or computing environment is improved by enabling the connections.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of connectivity protocols may be used. Further, variations to the processing may be performed without departing from one or more aspects of the present invention. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:
    obtaining a connection request from one computing entity, the connection request being a request to connect to another computing entity and including a requested connectivity protocol configuration;
    determining whether the requested connectivity protocol configuration is a match to a particular connectivity protocol configuration of the another computing entity;
    selecting from a plurality of configuration files a selected configuration file that matches the requested connectivity protocol configuration, based on determining that the requested connectivity protocol configuration does not match the particular connectivity protocol configuration of the another computing entity; and
    initiating routing of the connection request, based on selecting the selected configuration file, to a connectivity protocol service corresponding to the selected configuration file to facilitate establishing a connection between the one computing entity and the another computing entity.

2. The computer-implemented method of claim 1, further comprising checking, based on determining that the requested connectivity protocol configuration does not match the particular connectivity protocol configuration, whether the plurality of configuration files includes a configuration file that matches the requested connectivity protocol configuration, and wherein the selecting is performed based on the plurality of configuration files including the configuration file that matches the requested connectivity protocol configuration, the configuration file being the selected configuration file.

3. The computer-implemented method of claim 2, further comprising providing a failed connection indication to the one computing entity, based on the plurality of configuration files not including a matching configuration file to the requested connectivity protocol configuration.

4. The computer-implemented method of claim 3, further comprising:
    obtaining from the one computing entity another connection request, based on the failed connection indication, the another connection request including another requested connectivity protocol configuration determined based on historical configuration usage data of the one computing entity; and
    performing connection processing based on obtaining the another connection request.

5. The computer-implemented method of claim 1, wherein the determining whether the requested connectivity protocol configuration matches the particular connectivity protocol configuration of the another computing entity comprises performing one or more validations of protocol version and key exchange techniques and wherein there is the match based on the one or more validations being successful.

6. The computer-implemented method of claim 1, further comprising establishing the connection between the one computing entity and the another computing entity, wherein the establishing the connection includes starting the connectivity protocol service based on the selected configuration file.

7. The computer-implemented method of claim 6, further comprising monitoring, at least, the connectivity protocol service to determine whether action is to be taken for the connectivity protocol service.

8. The computer-implemented method of claim 7, wherein the action includes removing the connectivity protocol service.

9. The computer-implemented method of claim 1, wherein the one computing entity is a client and the another computing entity is a server.

10. The computer-implemented method of claim 9, wherein the client runs on one computing device and the server runs on another computing device.

11. A computer system for facilitating processing within a computing environment, the computer system comprising:
    a memory; and
    at least one processor in communication with the memory, wherein the computer system is configured to perform a method, said method comprising:
        obtaining a connection request from one computing entity, the connection request being a request to connect to another computing entity and including a requested connectivity protocol configuration;
        determining whether the requested connectivity protocol configuration is a match to a particular connectivity protocol configuration of the another computing entity;
        selecting from a plurality of configuration files a selected configuration file that matches the requested connectivity protocol configuration, based on determining that the requested connectivity protocol configuration does not match the particular connectivity protocol configuration of the another computing entity; and initiating routing of the connection request, based on selecting the selected configuration file, to a connectivity protocol service corresponding to the selected configuration file to facilitate establishing a connection between the one computing entity and the another computing entity.

12. The computer system of claim 11, wherein the method further comprises checking, based on determining that the requested connectivity protocol configuration does not match the particular connectivity protocol configuration, whether the plurality of configuration files includes a configuration file that matches the requested connectivity protocol configuration, and wherein the selecting is performed based on the plurality of configuration files including the configuration file that matches the requested connectivity protocol configuration, the configuration file being the selected configuration file.

13. The computer system of claim 12, wherein the method further comprises providing a failed connection indication to the one computing entity, based on the plurality of configuration files not including a matching configuration file to the requested connectivity protocol configuration.

14. The computer system of claim 13, wherein the method further comprises:

obtaining from the one computing entity another connection request, based on the failed connection indication, the another connection request including another requested connectivity protocol configuration determined based on historical configuration usage data of the one computing entity; and performing connection processing based on obtaining the another connection request.

15. The computer system of claim 11, wherein the method further comprises establishing the connection between the one computing entity and the another computing entity, wherein the establishing the connection includes starting the connectivity protocol service based on the selected configuration file.

16. A computer program product for facilitating processing within a computing environment, the computer program product comprising:

one or more computer readable storage media and program instructions collectively stored on the one or more computer readable storage media to perform a method comprising:

obtaining a connection request from one computing entity, the connection request being a request to connect to another computing entity and including a requested connectivity protocol configuration;

determining whether the requested connectivity protocol configuration is a match to a particular connectivity protocol configuration of the another computing entity;

selecting from a plurality of configuration files a selected configuration file that matches the requested connectivity protocol configuration, based on determining that the requested connectivity protocol configuration does not match the particular connectivity protocol configuration of the another computing entity; and initiating routing of the connection request, based on selecting the selected configuration file, to a connectivity protocol service corresponding to the selected configuration file to facilitate establishing a connection between the one computing entity and the another computing entity.

17. The computer program product of claim 16, wherein the method further comprises checking, based on determining that the requested connectivity protocol configuration does not match the particular connectivity protocol configuration, whether the plurality of configuration files includes a configuration file that matches the requested connectivity protocol configuration, and wherein the selecting is performed based on the plurality of configuration files including the configuration file that matches the requested connectivity protocol configuration, the configuration file being the selected configuration file.

18. The computer program product of claim 17, wherein the method further comprises providing a failed connection indication to the one computing entity, based on the plurality of configuration files not including a matching configuration file to the requested connectivity protocol configuration.

19. The computer program product of claim 18, wherein the method further comprises:

obtaining from the one computing entity another connection request, based on the failed connection indication, the another connection request including another requested connectivity protocol configuration determined based on historical configuration usage data of the one computing entity; and performing connection processing based on obtaining the another connection request.

20. The computer program product of claim 16, wherein the method further comprises establishing the connection between the one computing entity and the another computing entity, wherein the establishing the connection includes starting the connectivity protocol service based on the selected configuration file.

* * * * *